US008987673B2

(12) United States Patent
Niederlöhner et al.

(10) Patent No.: US 8,987,673 B2
(45) Date of Patent: Mar. 24, 2015

(54) DETECTOR ARRANGEMENT OF AN IMAGING SYSTEM DETECTOR DETECTING IONIZING RADIATION WITH AIR COOLING AND METHOD FOR COOLING THE DETECTOR ARRANGEMENT

(71) Applicants: Daniel Niederlöhner, Erlangen (DE); Claus Pohan, Baiersdorf (DE)

(72) Inventors: Daniel Niederlöhner, Erlangen (DE); Claus Pohan, Baiersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 83 days.

(21) Appl. No.: 13/686,178

(22) Filed: Nov. 27, 2012

(65) Prior Publication Data

US 2013/0134313 A1  May 30, 2013

(30) Foreign Application Priority Data

Nov. 28, 2011  (DE) .......................... 10 2011 087 211

(51) Int. Cl.
  *G01T 1/164* (2006.01)
  *G01T 1/16* (2006.01)
(52) U.S. Cl.
  CPC ................. *G01T 1/16* (2013.01); *G01T 1/1641* (2013.01); *G01T 1/1648* (2013.01)
  USPC .................................................. 250/363.03
(58) Field of Classification Search
  CPC ....................................................... G01T 1/2985
  USPC .................................................. 250/363.03
  See application file for complete search history.

(56) References Cited

U.S. PATENT DOCUMENTS

| 4,831,639 | A | 5/1989 | Harke |
| 5,444,752 | A | 8/1995 | Dobbs et al. |

(Continued)

FOREIGN PATENT DOCUMENTS

| CN | 1142177 A | 2/1997 |
| CN | 1526361 A | 9/2004 |

(Continued)

OTHER PUBLICATIONS

German Priority Document No. 10 2011 087 211.6, filed Nov. 28, 2011.

(Continued)

*Primary Examiner* — David Porta
*Assistant Examiner* — Hugh H Maupin
(74) *Attorney, Agent, or Firm* — Harness, Dickey & Pierce, P.L.C.

(57) ABSTRACT

A detector arrangement of an imaging system detector detecting ionizing radiation includes a detector carrier, a plurality of detector modules attached to the detector carrier, and a collimator disposed in the radiation direction in front of the detector modules which are disposed on the incident radiation measurement side. In at least one embodiment, at least one air gap is included for conveying cooling air is disposed between the collimator and the measurement sensors of the detector modules. A method is also disclosed for cooling a detector arrangement of a detector rotating around a system axis with a plurality of measurement sensors disposed next to one another and a collimator arranged in the radiation direction in front of the measurement sensors, wherein cooling air is conveyed in or against the system axis direction between the collimator and the measurement sensors which directly cools the surface of the measurement sensors.

20 Claims, 4 Drawing Sheets

(56) References Cited

U.S. PATENT DOCUMENTS

| | | |
|---|---|---|
| 7,851,765 B2 | 12/2010 | Heismann et al. |
| 2004/0075059 A1 | 4/2004 | Serebryanov et al. |
| 2004/0174951 A1 | 9/2004 | Hoffman |
| 2005/0117698 A1 | 6/2005 | Lacey et al. |
| 2006/0097174 A1 | 5/2006 | Hoge |
| 2006/0118730 A1* | 6/2006 | Hefetz et al. ............. 250/370.09 |
| 2007/0121781 A1 | 5/2007 | Meirav et al. |
| 2007/0278412 A1* | 12/2007 | Hackenschmied et al. ........................ 250/363.08 |
| 2007/0284535 A1* | 12/2007 | Heismann et al. ....... 250/370.15 |
| 2009/0261238 A1* | 10/2009 | Ahn et al. ..................... 250/238 |

FOREIGN PATENT DOCUMENTS

| | | |
|---|---|---|
| CN | 1625320 A | 6/2005 |
| CN | 1688898 A | 10/2005 |
| CN | 101082675 A | 12/2007 |
| DE | 102006024972 A1 | 12/2007 |

OTHER PUBLICATIONS

German Office Action dated Oct. 17, 2012 and English translation thereof.

Office Action for corresponding Chinese patent application No. 201210495245.7 dated Jun. 3, 2014.

* cited by examiner

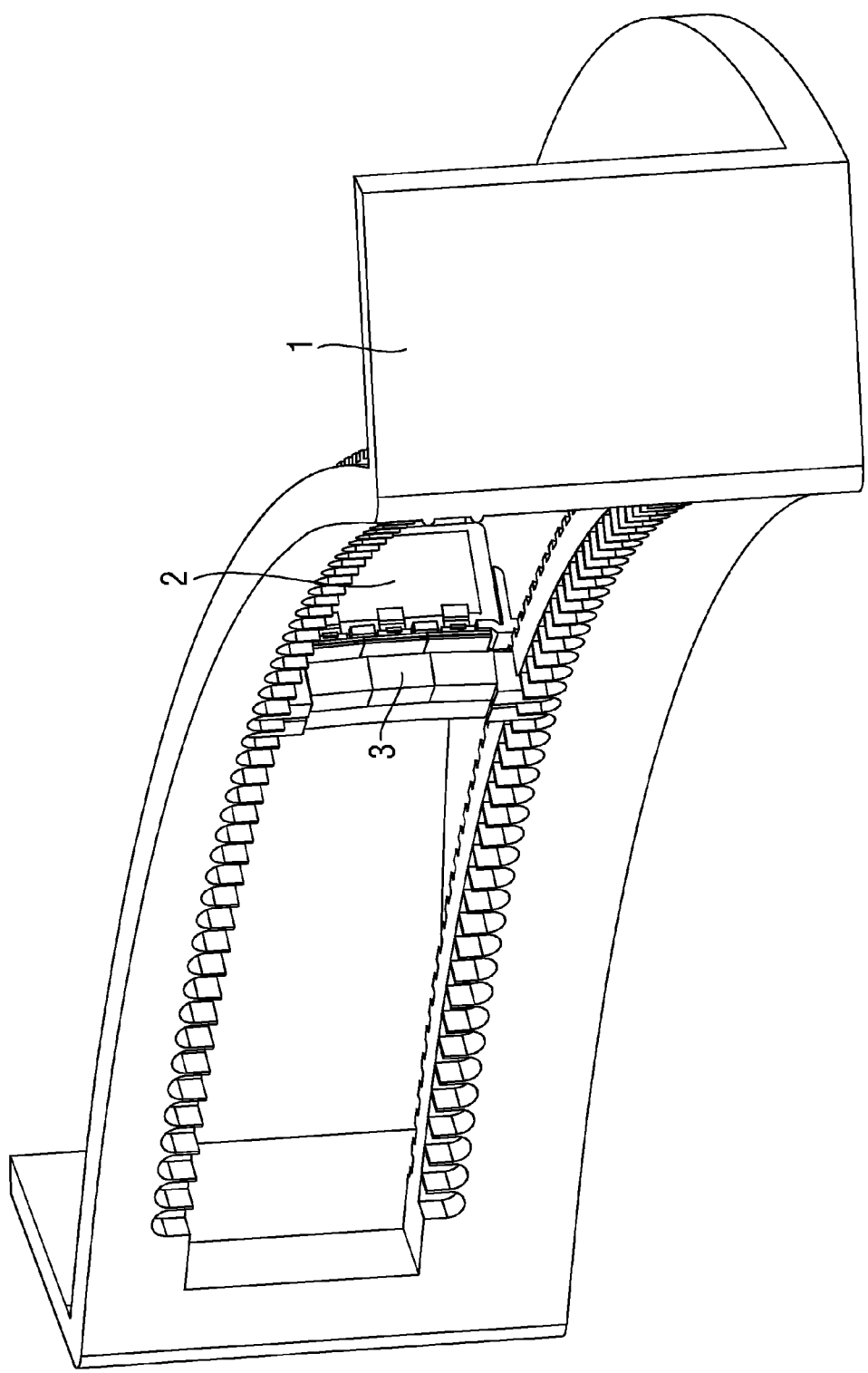

DETECTOR ARRANGEMENT OF AN IMAGING SYSTEM DETECTOR DETECTING IONIZING RADIATION WITH AIR COOLING AND METHOD FOR COOLING THE DETECTOR ARRANGEMENT

PRIORITY STATEMENT

The present application hereby claims priority under 35 U.S.C. §119 to German patent application number DE 10 2011 087 211.6 filed Nov. 28, 2011, the entire contents of which are hereby incorporated herein by reference.

FIELD

At least one embodiment of the invention generally relates to a detector arrangement of a CT system, having a detector carrier, a plurality of detector modules attached to the detector carrier and a collimator disposed in the beam direction in front of the detector modules, wherein the detector modules have measurement sensors which are disposed on the incident radiation measurement side. At least one embodiment of the invention also generally relates to a method for cooling a detector arrangement of a detector of a CT system rotating around a system axis with a plurality of measurement sensors disposed next to one another and a collimator arranged in the beam direction in front of the measurement sensors.

BACKGROUND

Detector arrangements of an imaging system detector detecting ionizing radiation with air cooling and cooling methods for such detector arrangements are generally known. The reader is referred to US 2005/0117698 A1 by way of example. This presents a radiation detector of a CT system in which a circulating flow of air is cooled by active cooling elements, for example a Peltier element, and is guided through gaps in the detector electronics for cooling the detector.

SUMMARY

At least one embodiment of the invention is directed to an improved detector arrangement of an imaging system detector detecting ionizing radiation with air cooling and an improved method for cooling the detector arrangement.

Advantageous developments of the invention are the subject matter of subordinate claims.

Measurement modules of CT detectors generally possess temperature-dependent properties so that, without corrective measures such as cooling, temperature stabilization etc., temperature dependencies of the sensors lead to errors in measuring the intensity of the radiation and thereby to image artifacts. This applies especially to measurement modules in which analog/digital converter elements are disposed in a sandwich construction directly below the sensor consisting of scintillator array and photodiode array. These A/D converters generate dissipated heat which must be removed. This temperature dependency of the sensor is even more critical in the photon-counting direct converter systems, so-called "counting detectors", the sensor material of which is based on CdTe for example and in which the irradiation of the sensor material and the removal of the charge arising there by an applied voltage itself generates heat.

In addition the functionally necessary and inevitably also thermally-coupled sandwich construction of the sensors with the sensor electronics embodied as an ASIC—even despite a coupling-in of rear-side heatsinks or any other cooling of the sensor electronics which might be present—can result in a not insignificant and therefore image-relevant input of heat into the sensor material itself.

The inventors have recognized that the measurement accuracy of such detectors, especially counting detectors, can be significantly improved when it can be ensured that a cooling airflow passes directly over the surface of the sensor material and thus keeps said material at a temperature which is always the same during the measurement process. It is especially favorable for the detector embodied as a planar detector to select the flow direction such that it is conveyed along the shortest length of the surface formed by the sensor material, so that if possible no relevant heating process of the cooling air arises during its passage over the sensor surface. This ensures an even cooling over the entire surface of the detector and temperature-dependent drift, especially of a counting detector, is greatly reduced or even avoided.

In accordance with this knowledge, the inventors propose improving a detector arrangement of an imaging system detector detecting by ionising radiation, having a detector carrier, a plurality of detector modules attached to the detector carrier, a collimator disposed in the beam direction in front of the detector modules, wherein the detector modules have measurement sensors which are disposed on the incident radiation measurement side, such that at least one air gap is disposed for the passage of cooling air between the collimator and the measurement sensors of the detector module.

As well as an embodiment of the inventive detector arrangement, the inventors also propose a method in at least one embodiment for cooling a detector arrangement of a detector rotating around a system axis with a plurality of measurement sensors disposed next to one another and a collimator disposed in the radiation direction in front of the measurement sensors, wherein the cooling air which directly cools the surface of the measurement sensors is conveyed in or against the system axis direction between the collimator and the measurement sensors. With the detector embodied as a planar detector, it is particularly advantageous to select the flow direction such that the flow is along the shortest length of the area formed by the sensor material, so that no relevant heating of the cooling air takes place, if possible, while the air flows the sensor surface.

BRIEF DESCRIPTION OF THE DRAWINGS

The invention is explained in greater detail below with the aid of the figures, with reference to a preferred example embodiment, wherein only the features necessary for understanding the invention are presented. The following reference characters are used: C1: CT system; C2: X-ray tubes; C3: Detector; C6: Gantry housing; C8: Couch; C9: System axis/z-axis; C10: Control and processing unit; 1: Detector carrier; 1a: Base plate; 2: Detector module; 3: Collimator; 4: Air inlet openings; 5a: Inlet air channel; 5b: Outlet air channel; 6, 6a: Module carrier; 7: Air gap; 8: Measurement sensors; P: Patient; Prg1-Prgn: Computer program.

The individual figures are as follows:

FIG. 4 shows a further 3D view of a detector carrier for a plurality of detector modules with two detector modules installed as an example, in an internal radial view.

DETAILED DESCRIPTION OF THE EXAMPLE EMBODIMENTS

Figure 1:
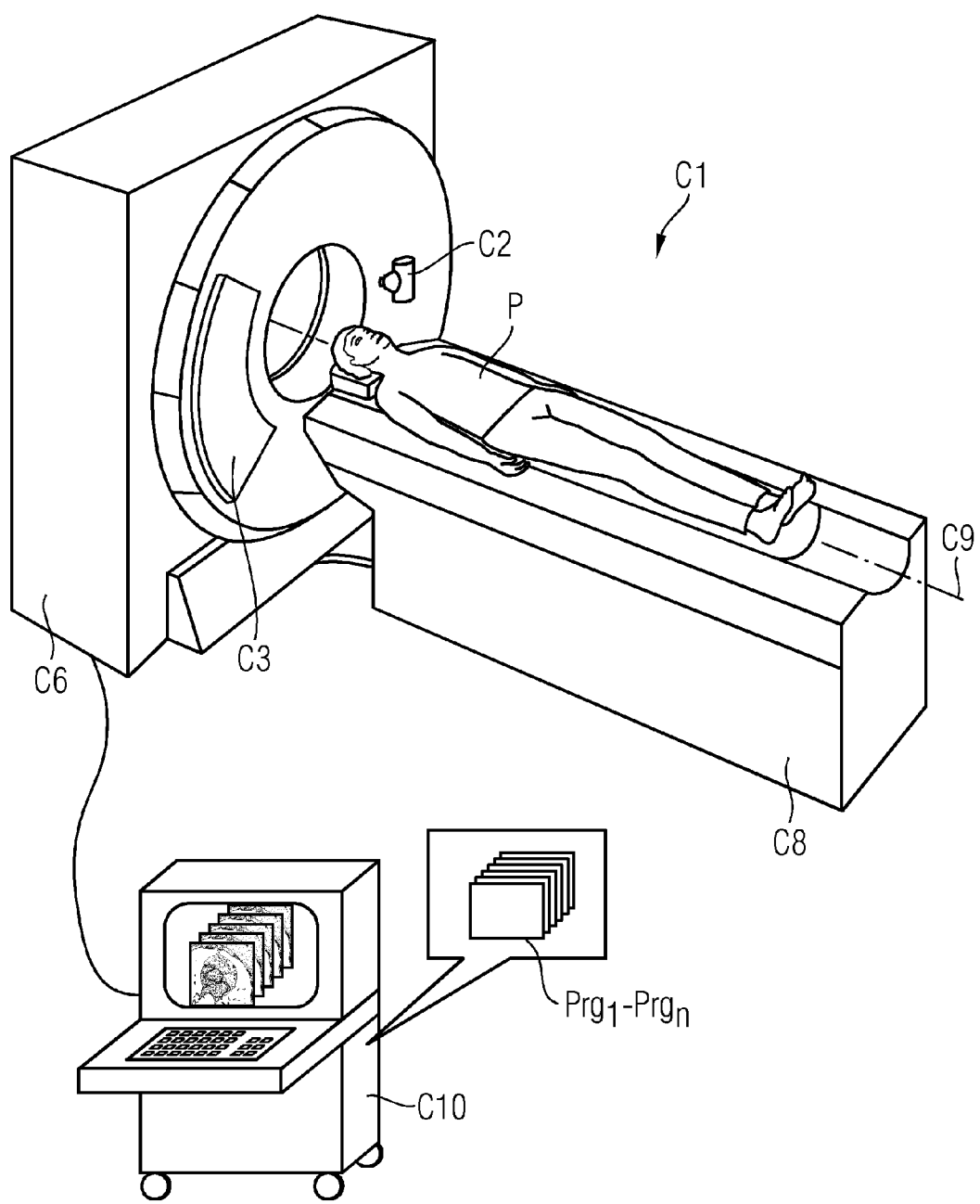
FIG. 1 shows an embodiment of CT system with counting detector with inventive air cooling.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In accordance with this knowledge, the inventors propose improving a detector arrangement of an imaging system detector detecting by ionising radiation, having a detector carrier, a plurality of detector modules attached to the detector carrier, a collimator disposed in the beam direction in front of the detector modules, wherein the detector modules have measurement sensors which are disposed on the incident radiation measurement side, such that at least one air gap is disposed for the passage of cooling air between the collimator and the measurement sensors of the detector module.

This air gap acting as a channel serves to allow the cooling air for the sensor material to pass directly over the sensor material and thus remove heat arising there continuously and at least during operation. The sensor material is thus kept constantly at an even temperature so that sensor drift is avoided where possible.

It is advantageous in this detector arrangement for a plurality of air channels to be disposed on the detector carrier for cooling air transport into and out of the at least one air gap. This enables the cooling airflow to be aligned so that where possible no loss of cooling power occurs.

It is useful with the presence of such air channels for at least some of the channels to be embodied as inlet channels which effect an explicit supply of cooling air to the at least one air gap between the measurement sensors and the collimator. On the other hand the air channels can be embodied at least partly as outlet channels which effect an explicit removal of cooling air from the at least one air gap. Overall the inlet and outlet channels allow dedicated air guidance for optimum cooling of the measurement sensors to be achieved.

It is especially advantageous in such cases for precisely one air gap and one inlet channel and one outlet channel to be embodied in each case for each detector module. This enables each detector module to be explicitly assigned an individual airflow which is also able to be influenced individually—for example via adjustable choke elements—if necessary so that, by control or regulation of the throughflow for each detector module, an optimal even temperature over the entire detector is possible overall.

To supply the air channels with cooling air for example a pressure channel to which overpressure is applied can be disposed on the detector carrier of the gantry to which cooling air is supplied. As an alternative or in addition, for transporting away the cooling air a suction channel to which a vacuum is applied can also be disposed on the detector carrier which takes away used cooling air.

It is especially useful for an even cooling of a detector arrangement with a greater longitudinal extent in the circumferential direction disposed on a gantry rotating around a z-axis for the inlet channels or the outlet channels respectively to be disposed in each case on the same side of the detector module so that a cooling airflow in parallel to the z-axis, also referred to as the system axis direction, arises. This avoids a relevant heating occurring during the path of the cooling air along the sensor surface and the cooling effect along the path of the cooling air on the sensor service very largely remains the same.

In an example embodiment of the inventive detector arrangement, the detector modules can be attached by detector module carriers to the detector carrier and the collimator can also be constructed from a number of modules. The attachment of the detector modules in this case can be designed so that the attachment elements which attach the detector modules to the detector carrier, together with the detector carrier, form the air inlet and outlet channels, wherein retaining elements, e.g. screws also pass through these channels and have expansions around the retaining elements at these points in order to avoid obstructions.

In addition to the inventively embodied cooling of the measurement sensors, the detector arrangement can also have additional cooling of the detector modules for the measurement electronics contained there.

The measurement sensors can also have sensor material which converts x-ray radiation directly into electrical charge and the detector modules have circuit arrangements which determine the energy and the number of incident photons. This means the detector arrangement can be embodied as a counting detector, especially a photon-counting detector.

Furthermore the detector arrangement can preferably be built into a CT system, a PET system, an SPECT system or into a combination of the aforesaid systems.

As well as an embodiment of the inventive detector arrangement, the inventors also propose a method in at least one embodiment for cooling a detector arrangement of a detector rotating around a system axis with a plurality of measurement sensors disposed next to one another and a collimator disposed in the radiation direction in front of the measurement sensors, wherein the cooling air which directly cools the surface of the measurement sensors is conveyed in or against the system axis direction between the collimator and the measurement sensors.

FIG. 1 shows a CT system C1 for imaging a patient B with the aid of tomographic images. The CT system consists of a gantry housing C6, in which a gantry not shown in any greater detail is located, to which a detector system C3 with an inventive detector arrangement is attached. For scanning the patient P x-rays are emitted from an x-ray tube C2 attached opposite the detector C3 on the gantry and the radiation attenuated by the patient is measured in relation to the attenuation of its intensity from a plurality of projection angles with a rotating gantry. During the measurement and rotation of gantry around the system axis or z-axis C9 respectively, the patient P can be moved with the aid of the couch C8 able to be driven along the system axis C9 through the measurement field in the gantry housing C6 continuously or sequentially, so that a spiral-shaped or circular-shaped scanning of the patient P occurs.

This process is controlled by a control and processing unit C10, which also has programs Prg1-Prgn in its memory, which evaluate the received detector data during operation and carry out the reconstruction of tomographic images. If the counting detector C3 is operated energy-selectively, energy-selective tomographic image data can be determined and thus also material breakdowns or ρ/Z breakdowns carried out. However very precise intensity measurements with the detector C3 are necessary for this, in order that image artifacts do not adversely effect the results.

Figure 2:
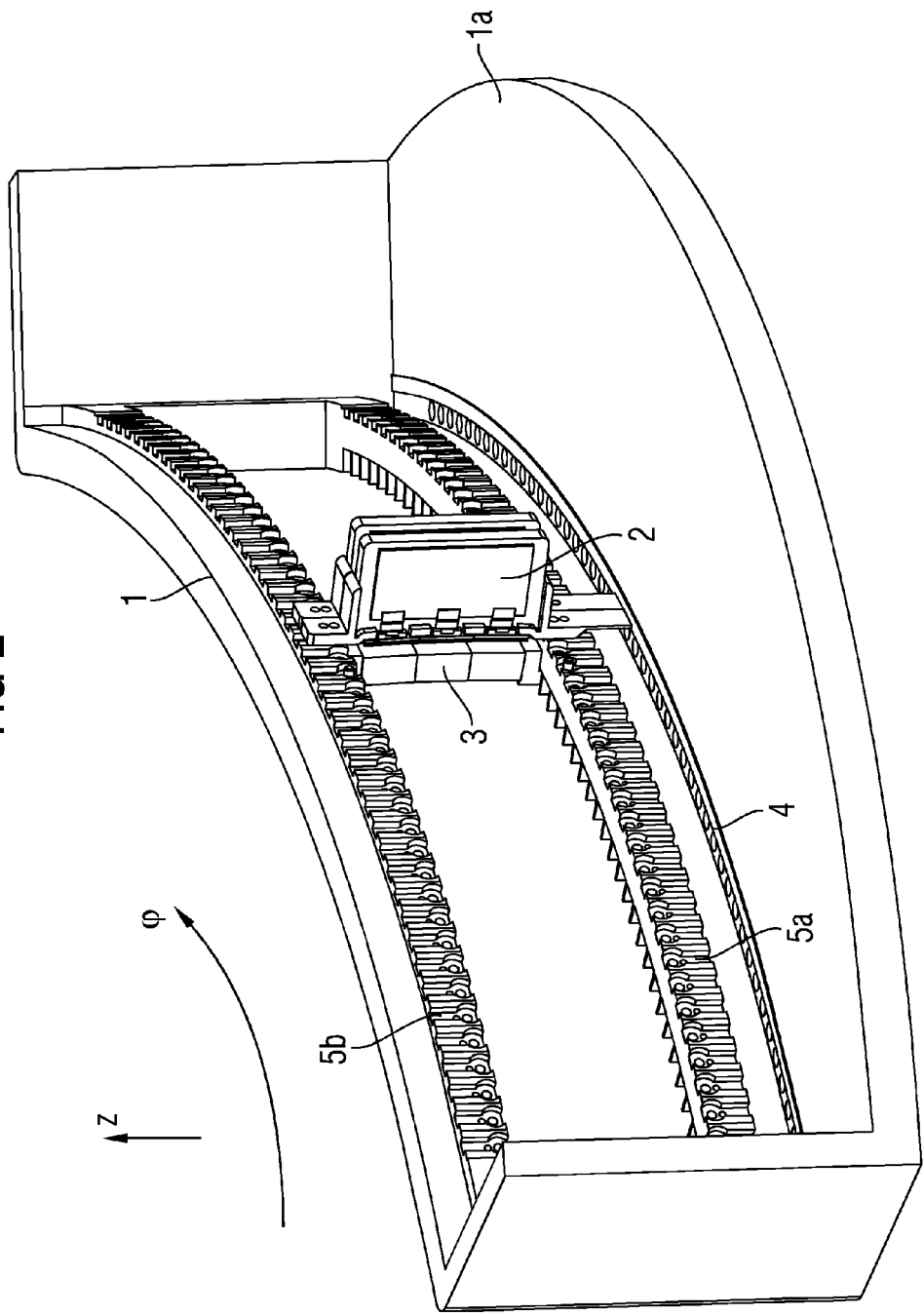
FIG. 2 shows a 3D view of a detector carrier for a plurality of detector modules with two detector modules installed as an example, in an external radial view.
Figure 3:
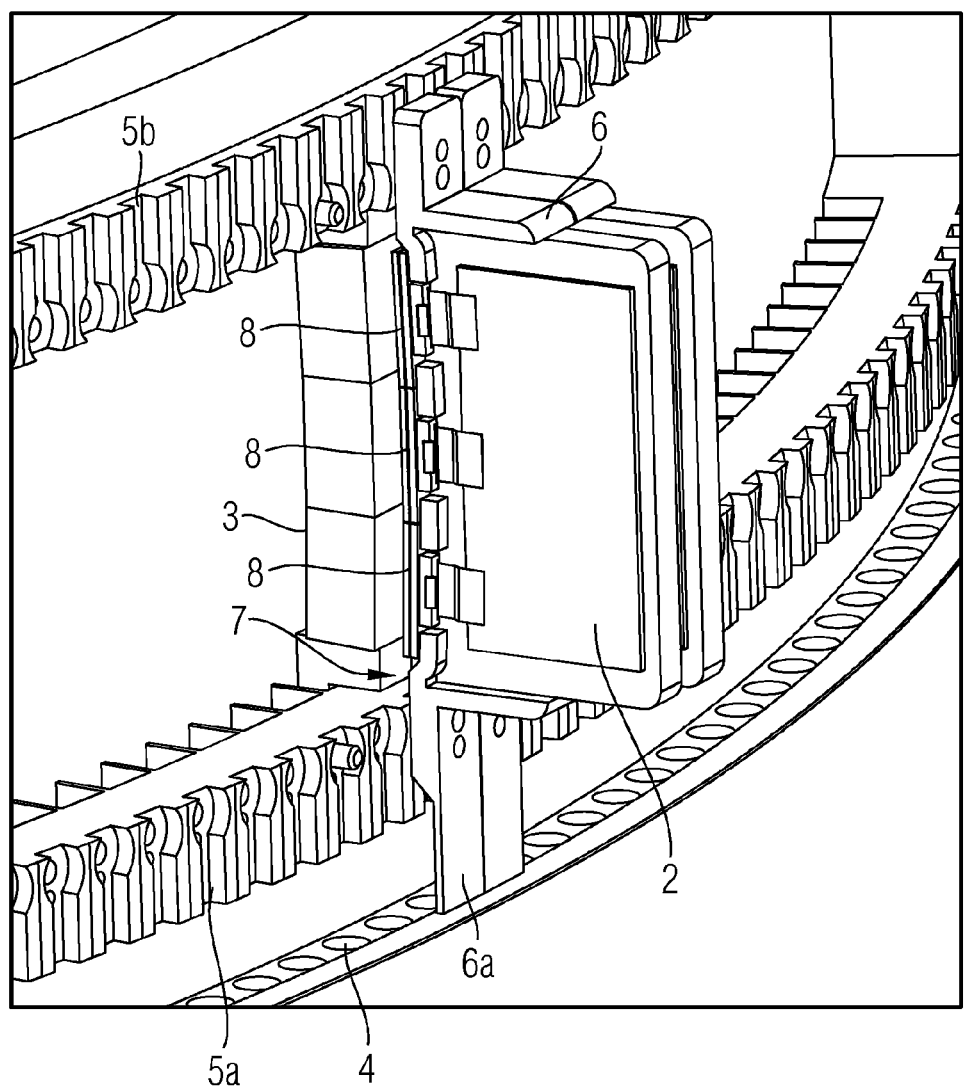
FIG. 3 shows a detailed view in the area of the installed detector modules from FIG. 2

In accordance with at least one embodiment of the invention the detector is thus constructed according to a detector arrangement as shown in FIGS. 2 to 4.

FIG. 2 shows a 3D view radially from outside of a detector carrier for a plurality of detector modules with two detector modules 2 installed by way of example. A detailed view of this embodiment in the area of the detector modules 2 shown installed is presented in FIG. 3 and FIG. 4 shows a 3D view radially from the inside of the detector carrier.

The detector in this case includes a detector carrier 1, in which a number of detector modules 2 are installed in the shape of an arc and aligned to the focus of a radiation source not shown here—for example the focus of the x-ray tubes C2 from FIG. 1. Located directly below the detector modules 2 is a row of their inlet openings 4 likewise disposed in the shape of an arc within the base plate 1a of the detector carrier 1.

These inlet openings 4 are connected in the assembled state of the detector in the CT system to a balancing channel not shown in the diagram which, during operation, generates a flow of cool air through the inlet openings 4 into the interior of the detector by overpressure. This air flow is conveyed between the collimator 3 and the detector modules 2 directly across the surface of the measurement sensors 8.

This is achieved by the detector carrier 1 and the detector modules 2 being constructed so that there is a continuous air gap 7 between the measurement sensors 8 or their surfaces and the collimator 3 located in front of them.

The complete air gap 7 is formed here by the following components:

Below the measurement sensors 8 in the z-direction: Air inlet openings 4 and module carriers 6, 6a or contact surface of the detector module 2 and lower air channel 5a, wherein the lower air channel 5a here is a volume-shaped cutout on the module carrier service in the detector carrier 1;

In the area of the measurement sensors 8: Surface of the measurement sensors 8 and radiation exit side of the collimator 3;

Above the measurement sensors 8 in the z-direction: Contact surface of the detector module 2 and upper air channel 5b.

The gap 7 in the area of the measurement sensors 8 or the distance between the radiation exit side of the collimator 3 and the measurement sensors 8 is thus realized in the example embodiment shown by the bridge-shaped collimator 3, by contrast with versions of the prior art, not sitting directly on the sensor surfaces or being glued to said surface, but being installed separately from the front into the detector carrier 1 and thus a gap being maintained between the sensor surface and collimator so that a constructional gap is produced.

As an alternative, the gap 7 can also be realized by constructional embodiments other than those given in the example embodiment. Thus the detector modules 2, instead of the detector carrier 1, can also have corresponding cutouts on the contact surfaces for forming the air channel. An installation of the bridge-shaped collimators 3 directly on the detector modules 2 is also possible if the collimators 3 are installed by way of spacers with corresponding air inlet openings. These spacers can also be an integrated component of the collimators 3 themselves.

Of importance for the invention in the version of the detector arrangement shown is that the option is provided by the constructive version shown here of cooling the temperature-sensitive measurement sensors 8 directly on their surface and thus of achieving a significantly better heat dissipation than via heatsinks located behind the sensors. The airflow in the z-direction of the modules guarantees that the cooling air only has to cover a relatively short distance over the sensor elements disposed in the z-direction. This prevents the air being able to heat up greatly over long distances which, for a throughflow in the p-direction or for a flow of cooling air taking in a number of detector modules 2, would lead to greater temperature gradients.

An advantage of at least one embodiment of the invention is that for direct cooling of the measurement sensors 8, apart from air, no radiation-absorbing materials are necessary between the x-ray radiation source and the measurement sensors 8. Only an airflow absorbing very little radiation is conveyed over the sensor surfaces. Temperature fluctuations can be drastically minimized through at least one embodiment of the inventive direct air cooling across the surface of the sensors.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

Although the invention has been illustrated and described in greater detail by the preferred example embodiment, the invention is not restricted by the disclosed examples and other variations can be derived herefrom by the person skilled in the art, without departing from the scope of protection of the invention.

What is claimed is:

1. A detector arrangement of an imaging system detector detecting ionizing radiation, comprising:
    a detector carrier;
    a plurality of detector modules attached to the detector carrier;
    a collimator, disposed in the radiation direction in front of the detector modules, the detector modules including measurement sensors disposed on an incident radiation measurement side, at least one cooling air gap, for conveying cooling air, between a surface of the collimator and a surface of the measurement sensors of the detector modules, wherein the cooling air passes directly over the surface of the measurement sensors along the shortest distance of the surface of the material of the sensors.

2. The detector arrangement of claim 1, wherein a plurality of air channels are disposed on the detector carrier for transport of cooling air into and out of the at least one air gap.

3. The detector arrangement of claim 2, wherein the air channels are embodied at least partly as inlet air channels, which effect an explicit supply of cooling air to the at least one air gap.

4. The detector arrangement of claim 2, wherein the air channels are embodied at least partly as outlet air channels which effect an explicit removal of cooling air from the at least one air gap.

5. The detector arrangement of claim 1, wherein an air gap is provided for each detector module.

6. The detector arrangement of claim 1, wherein an inlet air channel and an outlet air channel are provided for each detector module.

7. The detector arrangement of claim 1, further comprising:
    a pressure channel carrying an overpressure is provided on the detector carrier, configured to supply cooling air.

8. The detector arrangement of claim 1, further comprising:
    a suction channel carrying a vacuum, provided on the detector carrier, configured to take away used cooling air.

9. The detector arrangement of claim 6, wherein the detector arrangement is disposed on a gantry rotating around the z-axis, includes its greatest longitudinal extent in the circumferential direction and wherein the inlet channels or the outlet channels respectively are disposed on the same side of the detector modules such that a cooling air flow arises in parallel to the z-axis.

10. The detector arrangement of claim 1, wherein the detector modules are attached to the detector carrier by detector module, carriers.

11. The detector arrangement of claim 1, wherein the collimator consists of a number of modules.

12. The detector arrangement of claim 1, wherein the measurement sensors include sensor material which converts x-ray radiation directly into electrical charge and wherein the detector modules include circuit arrangements which determine the energy and the number of incident photons.

13. The detector arrangement of claim 1, further comprising an additional cooling of the detector modules for the measurement electronics contained therein.

14. The detector arrangement of claim 1, wherein the detector arrangement is built into a system as given in the list below:
    CT system,
    PET system,
    SPECT system, a Combination of at least two of the CT system, PET system and SPECT system.

15. A method for cooling a detector arrangement of a detector rotating around a system axis with a plurality of measurement sensors arranged next to one another and a collimator disposed in the radiation direction in front of the measurement sensors, the method comprising:
conveying cooling air, in or against a direction of the system axis between a surface of the collimator and a surface of the measurement sensors, to directly cool the measurement sensors such that the cooling air passes directly over the surface of the measurement sensors along the shortest distance of the surface of the material of the sensors.

16. The detector arrangement of claim 2, wherein an air gap is provided for each detector module.

17. The detector arrangement of claim 2, wherein an inlet air channel and an outlet air channel are provided for each detector module.

18. The detector arrangement of claim 7, wherein the detector arrangement is disposed on a gantry rotating around the z-axis, includes its greatest longitudinal extent in the circumferential direction and wherein the inlet channels or the outlet channels respectively are disposed on the same side of the detector modules such that a cooling air flow arises in parallel to the z-axis.

19. The detector arrangement of claim 8, wherein the detector arrangement is disposed on a gantry rotating around the z-axis, includes its greatest longitudinal extent in the circumferential direction and wherein the inlet channels or the outlet channels respectively are disposed on the same side of the detector modules such that a cooling air flow arises in parallel to the z-axis.

20. At least one of a CT system, PET system and SPECT system comprising the detector arrangement of claim 1.

* * * * *